June 14, 1932. J. P. QUINN 1,863,206
COLLAPSIBLE AND TRANSPORTABLE HOUSING STRUCTURE
Filed July 13, 1928 3 Sheets-Sheet 1
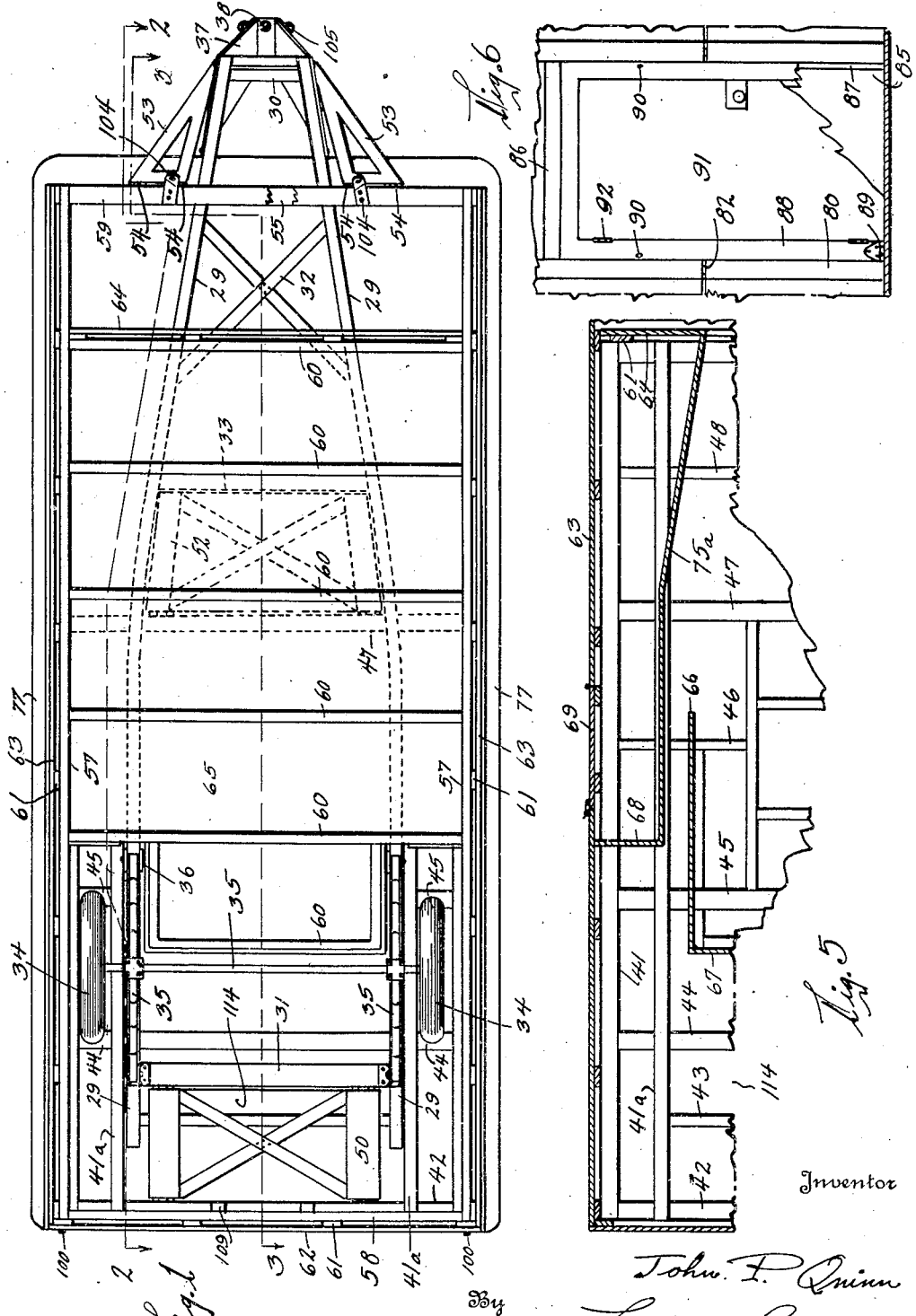
Inventor
John P. Quinn
By Lynn H. Latta Attorney

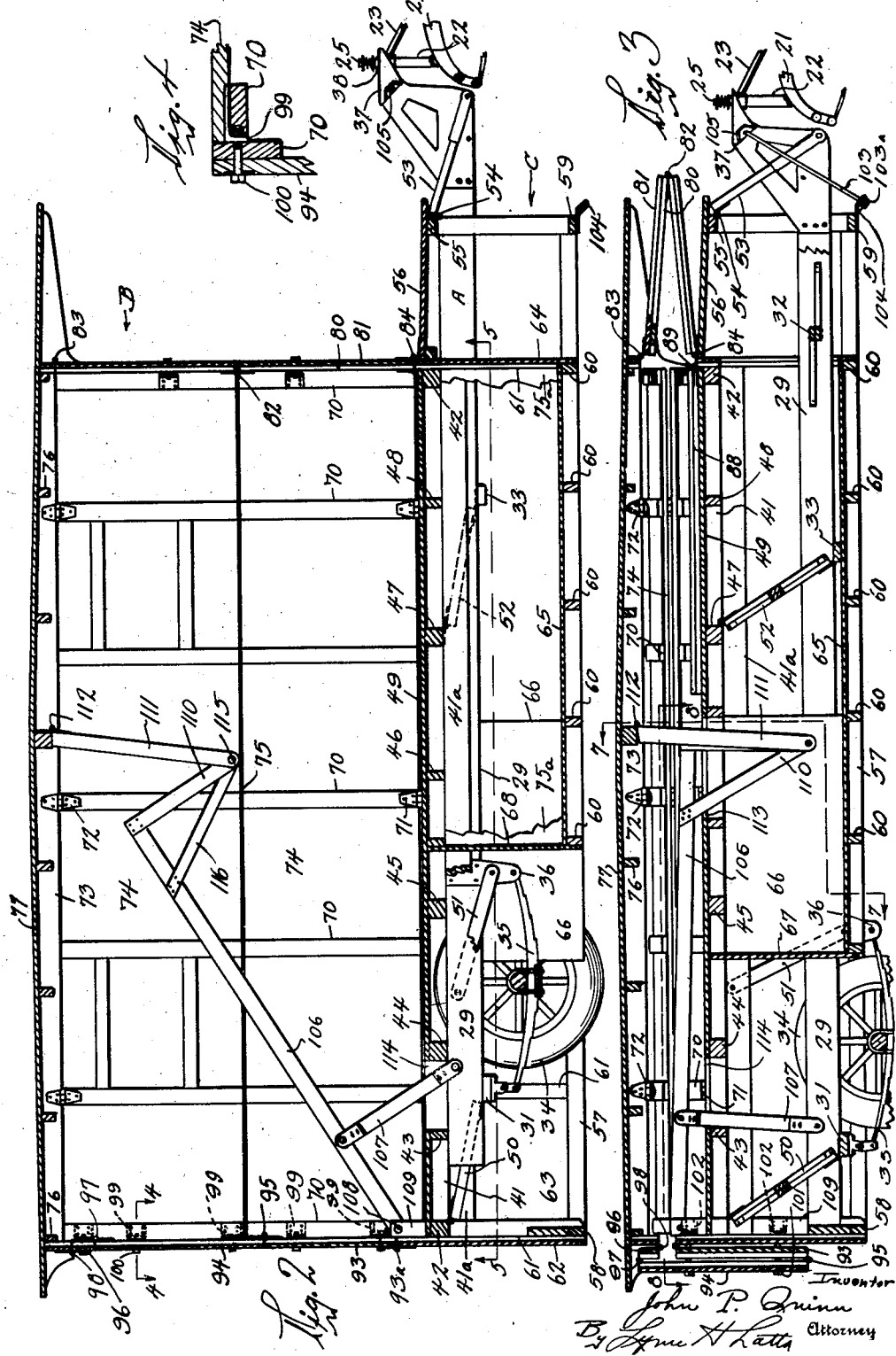

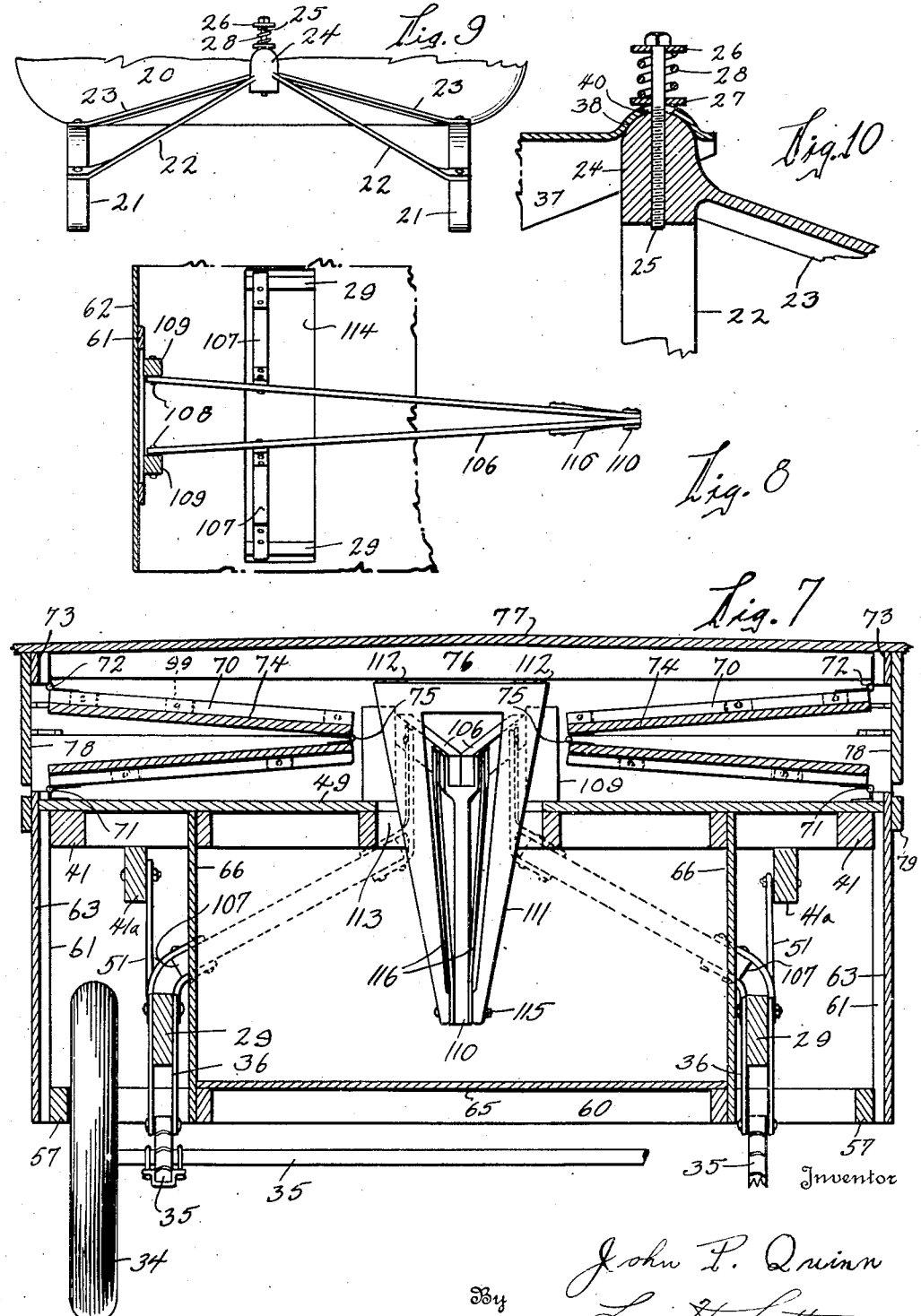

Patented June 14, 1932

1,863,206

UNITED STATES PATENT OFFICE

JOHN P. QUINN, OF SIOUX CITY, IOWA

COLLAPSIBLE AND TRANSPORTABLE HOUSING STRUCTURE

Application filed July 13, 1928. Serial No. 292,507.

My invention relates to housing structures of the transportable type, such as, for instance, automobile trailers for tourists' purposes, and has for its general object to provide a transportable housing structure which may be collapsed or folded to a compact package for transportation and which may be opened to form a housing structure for sleeping, eating, and allied purposes.

An object of my invention is to provide such a structure which is of simple, durable and inexpensive construction and to this end it is my purpose to provide a housing structure mounted on a pair of wheels, only one pair of wheels being employed and a front end of the structure being adapted to be supported by a vehicle of locomotion such as an ordinary passenger automobile, an independent motor truck or an independent pair of wheels such as a tongue truck, adapted to be drawn by a team of horses.

A further object of my invention is to provide a collapsible housing structure which may be quickly and easily actuated to change it from its folded condition to its opened state or vice versa. To this end, my invention contemplates the employment of a supporting frame, a collapsible super-structure, and a counterweight adapted to balance the weight of the super-structure during collapsing movement.

Another object of my invention is to provide a transportable housing structure in connection with a locomotive hitched in such a way that when folded, it will be drawn by the locomotive with a minimum of side sway and top swinging.

Still a further object of my invention is to provide such a foldable housing structure in which the balance ratio is practically uniform in all positions of the super-structure.

Another object is to provide such a foldable housing structure embodying a simple arrangement of hinging the side walls, part of which are adapted to collapse inwardly and part of which are adapted to collapse outwardly in order that the super-structure may fold downwardly to a very compact package without interference between the folding walls.

Another object is to provide such a foldable housing structure in which one of the outwardly collapsible side walls is arranged to swing downwardly to a substantially vertical depending position in order that it may not project substantially beyond the housing structure when in its folded position.

A further object is to provide such a foldable housing structure in which this downwardly foldable wall is adapted to be secured against the lower portion of the housing structure and to thereby secure the super-structure in its collapsed position.

Another object is to provide a foldable housing structure in which the floor is adapted to act as a part of the counterweight.

A further object is to provide such a foldable housing structure in which a storage compartment is provided to receive baggage, the storage compartment and baggage serving as counterweight and the proper amount of weight being thereby adjustable by the addition or substraction of baggage from the compartment.

Another object is to provide such a foldable housing structure embodying a floor, which, for the purpose of serving as a counterweight, is connected to the supporting frame by means of swinging arms, hinged to the floor and to the frame and disposed parallel to each other and to provide an element adapted to connect the under-structure of which the floor is a part, to the supporting frame when the super-structure is collapsed in order to aid in securing the super-structure in collapsed position.

Another object is to provide a door arranged to swing downwardly to allow collapsing of the super-structure and also arranged to hinge upon a vertical axis when the super-structure is in its open position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is an inverted plan view of the housing structure.

Fig. 2 is a vertical, longitudinal, sectional view taken on the line 2—2 of Fig. 1, illustrating in connection with the housing structure the rear portion of a locomotive chassis.

Fig. 3 is a vertical, longitudinal, sectional view of the same, taken on lines 3—3 of Fig. 1.

Fig. 4 is a detail, sectional view taken on the line 4—4 of Fig. 2.

Fig. 5 is a detail, sectional view taken in the horizontal plane and looking upwardly, taken on the line 5—5 of Fig. 2, the supporting frame being omitted.

Fig. 6 is an inside elevation of the door.

Fig. 7 is a transverse, sectional view of the housing structure taken on the line 7—7 of Fig. 3.

Fig. 8 is a horizontal, sectional view taken on the line 8—8 of Fig. 3, illustrating the lever arrangement in plan.

Fig. 9 is a rear elevation of the locomotive chassis.

Fig. 10 is an enlarged, detail, sectional view of the hitch.

I have used the reference character 20 to indicate generally the body of an automobile or the like, having the chassis side rails 21. The supporting member which forms a part of the hitch for the transportable housing structure comprises two pairs of derrick arms 22 and 23, which converge upwardly and inwardly to be united with a ball member 24 and are secured at their outer ends upon the chassis members 21 of the vehicle.

In the ball 24 (Fig. 10) is threaded a king pin 25, which is thereby removable from the ball. A portion of the pin normally projects above the ball to receive a pair of washers 26 and 27, between which is mounted a compression coil spring 28.

The housing structure is divided generally into three parts, a supporting frame, which is indicated generally by the reference character A, a super-structure, which is indicated generally by the reference character B, and an under-structure, which is indicated generally by the reference character C.

The supporting frame comprises a pair of rails 29, which are converged together at their forward ends, connected at their forward ends by a crosspiece 30, connected at their rear ends by a rear cross member 31, braced intermediate their ends by bracing 32, and provided with an intermediate cross member 33, (see Figs. 1, 2 and 3).

The rear portion of the supporting frame A is supported by a pair of wheels 34, which are mounted on an axle and spring structure 35, connected to the rear cross member 31 and brackets 36, thereby supporting the rails 29.

The forward extremity of the supporting frame A is supported on the supporting member shown in Fig. 9, by means of a yoke 37, which bridges the space between the forward ends of the rails 29, and which is provided with a socket 38 to receive the crown of the supporting ball 24. An enlarged opening 40 receives the king pin 25, and the washer 27 rides against the socket 38, resiliently retaining the socket in connection with the ball.

It may be noted at this point that the yoke 37 extends upwardly a substantial distance above the supporting frame A and (Fig. 3) that the ball and socket connection is positioned in a plane substantially dividing the folded housing structure equally in a vertical direction. Inasmuch as the weight of the under-structure C will normally be approximately three times the weight of the super-structure, it will be seen that the point of support for the forward portion of the structure will be substantially above the center of gravity of the structure in folded position.

As a consequence, side pressure against the structure when being pulled rapidly around curves and the like will be taken up entirely by the supporting frame and it will be impossible for side swinging of the top to occur.

The under-structure C comprises a floor frame having the side sills 41, the intermediate sills 41a, the end sills 42, and the intermediate floor joists 43, 44, 45, 46, 47 and 48. Flooring 49 is secured to the joists and sills.

Two of the swinging arms which connect the under-structure to the supporting frame are shown in Fig. 1 and comprise each a pair of side bars and cross bracing, as shown in that figure. The arms will be referred to generally by the reference characters 50, 51, 52 and 53. The arms 50 and 52 are of the type just described and the arms 51 comprise merely a pair of links such as steel bars, journalled to the brackets 36 and to the sills 41a, as shown in Fig. 2. The arms 53 comprise a pair of triangular shaped members, illustrated in Fig. 1, hinged at their rear extremities, as at 54, to the cross member 55 of a porch 56 and journalled at their forward ends to the rails 29, as shown in Fig. 2.

The arm 50 is hinged between the end sill 42 and the cross member 31, as shown in Fig. 2 and the arm 52 is hinged between the joist 47 and the cross member 33.

The under-structure C includes not only the floor 49, but is adapted to serve also as a storage compartment and to this end it includes a pair of lower side frame members 57, connected by end members 58 and 59 and by intermediate cross pieces 60 to form a lower frame which is connected with the floor by upright studs 61 and side, rear and front skirt walls 63, 62 and 64, respectively, to form a depending skirt which partially encloses the supporting frame and wheel structure and which has the same dimensions horizontally as the super-structure forming the housing portion of the structure.

The storage compartments utilize a portion of the space enclosed by the skirt and comprise a central compartment shown in Fig. 2 and embodying a floor 65, supported upon the joists 60, the forward skirt wall 64, a pair of side panels 66 (Figs. 3 and 5), a rear wall 67, connecting the panels 66. These walls are shown in horizontal section in Fig. 5 and are broken away in Fig. 2 to better illustrate construction.

The panels 66 and rear walls 67 form a narrow extension of the central compartment which is received between the springs 35.

The side storage compartments comprise the walls 75a, the front skirt wall 64, the rear walls 68, the side skirt walls 63, and doors 69, which allow access to these side compartments.

It will be noted that a space is left between the panels 66 and the walls 75a to receive the rails 29 of the supporting frame and to allow them to move relative to the under-structure C.

The super-structure B comprises side walls including studs 70, some of which are hinged by means of hinges 71 and 72, respectively, to the floor and to the side frame members 73 of the roof and side walls 74, secured to the studs 70. Each side wall is composed of two sections which are equal in height and which are hinged together by means of hinges 75.

The roof includes the side frame member 73 and the cross joists 76, to which are secured the roofing boards 77. A pair of side boards 78 (Fig. 7) project below the frame member 73 and are adapted to engage stops 79, secured to the skirt walls 63.

It will be understood that although the stops 78 and 79 are shown and described for the purpose of limiting the downward movement of the roof, that the super-structure might be constructed without these elements and the weight of the roof sustained in the folded position of the super-structure by engagement of the outer extremities of the side walls 74 and inner extremities of front wall 81. In such a case, these walls would be positioned closer to the floor in its folded position than as shown in the drawings and it would be necessary to rearrange the distance between the hinges 71, 72, 83 and 84, by extending walls from the side frame, members 73 and the front joist 76 downwardly to positions where they would engage with the outer and inner extremities of the walls 74 and 81, respectively, when resting in folded position.

It must be noted that the two side walls and the front wall, each of which are in two sections of equal height, would then have to be of less height in order to allow for the greater height of the downwardly extending wall, referred to in the foregoing paragraph, thereby necessitating the rearranging of the positions of the hinges.

Reference has been made to the object of elimination of side swing during operation and transportation of the housing structure. This is accomplished by means of the braced construction already described for the arms 50 and 52, together with the double hinged, triangular construction at 54 of the front arms 53.

The brace construction of the hinged arms connecting the floor and frame prevents side sway between the floor and frame, and side sway between the roof and floor is opposed by all the walls in its folded position or operation, hereinafter more fully described.

The forward wall comprises studs 80 and wall members 81 and is divided into two sections, hinged together as at 82, and hinged to the roof and floor, respectively, as at 83 and 84. The forward wall sections are cut away to provide a door opening 85 (Fig. 6) which is framed by the two inner studs 80 and an upper cross member 86. The wall members 81 project inwardly beyond the studs 80 and 86, framing the door opening to form a shoulder 87 encircling the door openings and against which the door frame 88 is adapted to rest.

The door frame 88 is received within the wall frame and is hinged to the floor as at 89 so that it may be dropped inwardly to the position shown in Fig. 3 preparatory to collapsing of the super-structure. The door frame 88 is secured by means of bolts 90 to the wall frame when the super-structure is extended and thereby serves to rigidify the forward wall structure. A door 91 is hinged at 92 for movement on a vertical axis in the door frame 88. It may now be noted that the front wall sections are so hinged as to collapse outwardly to the position shown in Fig. 3 and that the side wall sections are hinged so as to collapse inwardly to the positions shown in Fig. 7.

The rear wall, instead of being formed in two equal height sections, as are the other three walls described, is formed so that it may not only collapse outwardly but may also swing downwardly to a position folded against the rear skirt wall 62 of the under-structure. In order to attain this, I find that the most desirable method is to form the lower section 93 of the rear wall shorter than the section 94, which is hinged at 95 to the lower section and extends above it.

The section 93 is hinged at 93a at its lower edge to the skirt wall 62.

In order that the two sections 93 and 94 may lie flat against the skirt wall 62, however, it is necessary that the section 94 be positioned in a plane rearwardly of that of the section 93 and this necessitates the providing of an extra hinge connection, allowing the upper end of the section 94 to move away from the plane in which it is positioned when in extended position. To this end, I provide a narrow upper section 96, which is hinged at 97 to the intermediate section 94 and at 98 to the roof. The section 94 is then made of such length that the upper section 96 will be reversed during the collapsing movement, the hinge 97 moving from a position below the hinge 98 to a position above it, and the section 96 assuming a position in the same plane with the section 93.

It may be noted that the hinge 98 is positioned substantially below the plane of the hinges 72.

In order to secure the super-structure in its open position, I provide a number of brackets 99, adapted to receive bolts 100, extended through the wall sections 96, 94 and 93, respectively, and when the structure is collapsed, longer bolts 101 may be inserted through the openings from which the bolts 100 have been removed and threaded into brackets 102, similar to the brackets 99 shown in dotted lines in Fig. 3. The brackets 99 and 102 are secured to the end studs 70 and 61, respectively, of the side walls and side skirt.

The locking of the sections 94 and 93 against the skirt walls 62 securely holds the rear extremity of the super-structure in its collapsed position so that it may be transported over the road without unfolding.

In order to similarly lock the forward extremity of the super-structure, I provide a pair of rods 103, which are extended through openings in brackets 104 and 105 on the members 59 and the yoke 37 of the under-structure and supporting frame, respectively, the rod 103 being locked by a threaded nut or the like, 103a, so that movement of the under-structure downwardly relative to the supporting frame is prevented.

It may now be noted that the arms 50, 51, 52 and 53 disposed with their pairs of hinge axes in parallel planes relative to each other, will allow the under-structure to move upwardly and forwardly relative to the supporting frame. In thus moving upwardly, it is necessary to provide means for lifting the under-structure and thus the understructure may serve as a movable counterweight for the super-structure.

In order to utilize this weight for balancing the super-structure, I provide a lever 106, which is fulcrumed upon the under-structure by means of a pair of fulcrum arms 107, hinged to the lever and to the rails 29, respectively. The fulcrum arms 107 divide the lever 106 into a forward long portion, which is hinged to the roof and a rear short portion, which is hinged at 108 to a pair of posts 109, forming part of the skirt of the under-structure and projecting above the floor.

The upper end of the lever is provided with an L shaped portion 110, which is hinged to a pair of links 111, hinged in turn at 112 to the roof. The lever 106 is preferably formed as a triangular structure, as shown in Fig. 8, being hinged at its rear end at two separated points.

The purpose of the L shaped extension 110 is to allow the lever 106 to rest above the floor 49 when in its lowered position and yet to bring the hinge between the lever and the swinging link substantially below the floor, as shown in Fig. 3. To this end, the floor is provided with an opening 113, which is adapted to receive the L shaped extension and the links 111.

The fulcrum arms 107 extend through an opening 114 in the floor.

The object in positioning the hinge between the lever and the swinging links so far below the roof is to make it possible for the swinging links to take up the longitudinal movement of the lever as it swings downwardly with a minimum of swing in the links 111. In other words, if the links 111 were considerably shorter, they would swing through a much greater arc in order to take up the longitudinal movement of the lever 106 and there would be a much greater longitudinal force exerted against the roof and more of a tendency to bind between the rear end of the lever and the posts 109 during the downward swing of the lever.

It may now be noted that with the swinging arm construction, whereby the under-structure moves forwardly as well as upwardly, that the double hinged construction of the fulcrum arms 107 is necessary in order to adapt the lever 106 and supporting frame to this relative movement.

In loading the central storage compartment, it will be necessary to place the baggage so that it will not interfere with the movement of the arm 52 and the L shaped extension 110.

For this purpose, further partitions than those shown could be provided.

It may now be noted that the action of the lever 106 is such as to allow relative movement of the super-structure and under-structure only when they move in directions opposite to each other; that is, when the super-structure moves downwardly, the under-structure must move upwardly and vice-versa. Thus the downward movement of the under-structure under its own weight will tend to force the super-structure upwardly and it will be necessary for the operator to exert only a small amount of lifting power in order to raise the super-structure to its open position. In the same way, movement of the super-structure downwardly will lift the under-structure upwardly, the short portion of the lever 106 serving this latter purpose, and lifting against the posts 109. As the super-structure is raised or lowered, the walls will readily follow their respective movements to bring them to the positions already described for collapsed position of the structure. The action of folding or unfolding is therefore one of but a few moments' duration, it being only necessary to remove the locking bolts and to reinsert others again in their new positions.

The levers 106 and 111 are both of triangular construction, journalled together at their inner and lower ends respectively, by means of a single connection 115. At their outer and upper ends, however, these levers 106 and 111 are hinged to the under-structures and roof, by means of double hinge connections 108 and 112 respectively, for the purpose of preventing any side buckling during their operation.

The housing structure herein described and illustrated will be particularly useful for campers and tourists but may be employed for other purposes, such as eating wagons, traveling cooking shacks and the like. In fact, it is adaptable to any purpose where it is desired to have a transportable housing structure.

It may also be understood that the lever 106, the arms 107 and the swinging link 111 are detachable.

It may be further understood that the lever 106 might be constructed so as to extend directly from the bearing points 108 to the hinge 115 and by shortening the fulcrum arms 107 and by lengthening the opening 113.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a collapsible housing structure, a supporting frame, a floor, a collapsible super-structure comprising a roof, and side walls hinged to the roof and to the floor, the rear side wall comprising a lower section hinged to the floor, an intermediate section hinged to the lower section, and an upper section hinged to the intermediate section and to the roof, the sections being adapted to collapse outwardly when the latter is moved relative to the frame, a counterweight, and means connecting the counterweight, the frame, and the super-structure so as to balance the weight of the latter during folding or unfolding movement.

2. In a collapsible and transportable housing structure, a supporting frame, an understructure, a collapsible super-structure comprising a roof and side walls hinged to the roof and to the floor, a plurality of parallel arms hinged to the under-structure and to the frame in such a manner as to constrain the under-structure to longitudinal and upward movement relative to the frame, said arms comprising rigid structures of considerable width, whereby to brace the under-structure and frame against lateral movement relative to each other.

3. In a collapsible housing structure, a supporting frame, a floor, a collapsible super-structure, and means connecting the floor, the frame, and the super-structure so as to constitute the floor a counterweight for the super-structure during folding or unfolding movement of the latter, comprising a lever, a swinging fulcrum engaging the lever at an intermediate position, and engaging the frame, the lever being hinged at one end to the floor and at its other end to the super-structure.

4. In a collapsible and transportable housing structure, a supporting frame, a rectangular understructure, a collapsible super-structure comprising a rectangular roof and side walls hinged to the roof and to the under-structure, a plurality of parallel arms hinged to the understructure and to the frame in such a manner as to constrain the understructure to longitudinal and upward movement relative to the frame, means to brace the understructure against movement laterally of the frame.

5. In a collapsible housing structure, a supporting frame, an understructure, a collapsible superstructure, and means connecting the understructure, the frame and the superstructure so as to constitute the understructure a counterweight for the superstructure during folding or unfolding movement of the latter, said means comprising a lever, a swinging fulcrum engaging the lever at an intermediate position and engaging the frame, the lever engaging the understructure at one end and the superstructure at its other end.

JOHN P. QUINN.